(12) United States Patent
Chen et al.

(10) Patent No.: US 12,242,023 B2
(45) Date of Patent: Mar. 4, 2025

(54) BROADBAND ACHROMATIC POLARIZATION-INSENSITIVE METALENS WITH ANISOTROPIC NANOSTRUCTURES

(71) Applicant: PRESIDENT AND FELLOWS OF HARVARD COLLEGE, Cambridge, MA (US)

(72) Inventors: Wei-Ting Chen, Cambridge, MA (US); Alexander Yutong Zhu, Cambridge, MA (US); Federico Capasso, Cambridge, MA (US)

(73) Assignee: PRESIDENT AND FELLOWS OF HARVARD COLLEGE, Cambridge, MA (US)

( * ) Notice: Subject to any disclaimer, the term of this patent is extended or adjusted under 35 U.S.C. 154(b) by 922 days.

(21) Appl. No.: 17/279,060

(22) PCT Filed: Sep. 24, 2019

(86) PCT No.: PCT/US2019/052720
§ 371 (c)(1),
(2) Date: Mar. 23, 2021

(87) PCT Pub. No.: WO2020/068844
PCT Pub. Date: Apr. 2, 2020

(65) Prior Publication Data
US 2022/0048764 A1 Feb. 17, 2022

Related U.S. Application Data

(60) Provisional application No. 62/736,420, filed on Sep. 25, 2018.

(51) Int. Cl.
*G02B 1/00* (2006.01)
*B82Y 20/00* (2011.01)
(Continued)

(52) U.S. Cl.
CPC .............. *G02B 1/002* (2013.01); *B82Y 20/00* (2013.01); *B82Y 40/00* (2013.01); *G02B 5/1814* (2013.01)

(58) Field of Classification Search
CPC .. G02B 1/002; G02B 5/1814; G02B 27/0944; G02B 2207/101; B82Y 20/00;
(Continued)

(56) References Cited

U.S. PATENT DOCUMENTS 9,588,255 B1  3/2017  Tassin et al.
9,939,129 B2  4/2018  Byrnes et al.
(Continued)

FOREIGN PATENT DOCUMENTS

CN      108291983 A    7/2018
KR   2018-0099326 A    9/2018
(Continued)

OTHER PUBLICATIONS

Notice of Rejection with English translation for corresponding Japanese Patent Application No. 2021-540388, issued Apr. 13, 2023, 12 pages.
(Continued)

*Primary Examiner* — Darryl J Collins
*Assistant Examiner* — Matthew Y Lee
(74) *Attorney, Agent, or Firm* — FOLEY & LARDNER LLP

(57) ABSTRACT

Polarization-insensitive metasurfaces using anisotropic nanostructures are disclosed. These anisotropic structures allow for an accurate implementation of phase, group delay, and group delay dispersion, while simultaneously making it possible to realize a polarizationinsensitive, diffraction-limited and achromatic metalens for wavelength, e.g., $\lambda$=from about 460 nm to about 700 nm. The approach of polarization-insensitivity can be also applied for other metasurface
(Continued)

devices with applications in, e.g., imaging and virtual or augmented reality.

20 Claims, 7 Drawing Sheets

(51) Int. Cl.
*B82Y 40/00* (2011.01)
*G02B 5/18* (2006.01)

(58) Field of Classification Search
CPC ......... B82Y 40/00; B82Y 25/00; B82Y 30/00; G02F 2202/30; H01S 5/0071; H01Q 15/0086
See application file for complete search history.

(56) References Cited

U.S. PATENT DOCUMENTS

| | | | |
|---|---|---|---|
| 2013/0314765 A1* | 11/2013 | Padilla | G02F 1/133377 428/209 |
| 2016/0025914 A1 | 1/2016 | Brongersma et al. | |
| 2017/0082263 A1* | 3/2017 | Byrnes | G02B 1/005 |
| 2019/0154877 A1* | 5/2019 | Capasso | G02B 1/002 |
| 2019/0162592 A1* | 5/2019 | Khorasaninejad | G01J 3/00 |

FOREIGN PATENT DOCUMENTS

| | | |
|---|---|---|
| KR | 10-2018-0124106 A | 11/2018 |
| WO | WO-2016/044104 A1 | 3/2016 |
| WO | WO-2017/053309 A1 | 3/2017 |
| WO | WO-2017/091738 A1 | 6/2017 |
| WO | WO-2017176921 A1 * | 10/2017 ............... G02B 1/00 |

OTHER PUBLICATIONS

Notice of Rejection with English translation for corresponding Japanese Patent Application No. 2021-540388, issued Jan. 5, 2023, 14 pages.

International Search Report and Written Opinion for International Patent Application No. PCT/US2019/052720, issued on Dec. 4, 2019, 8 pages.

* cited by examiner

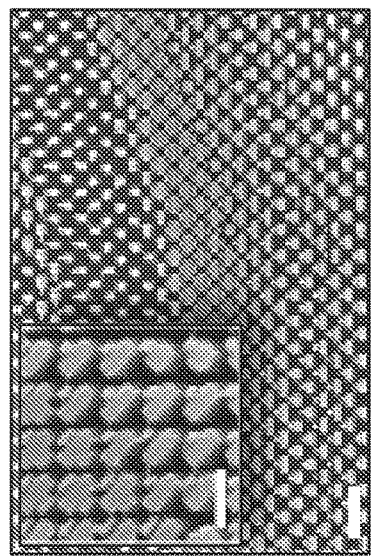
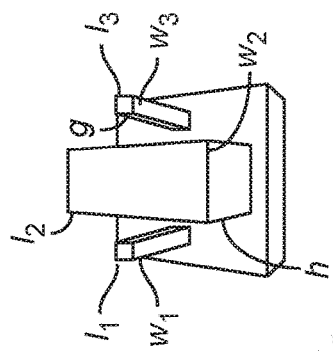
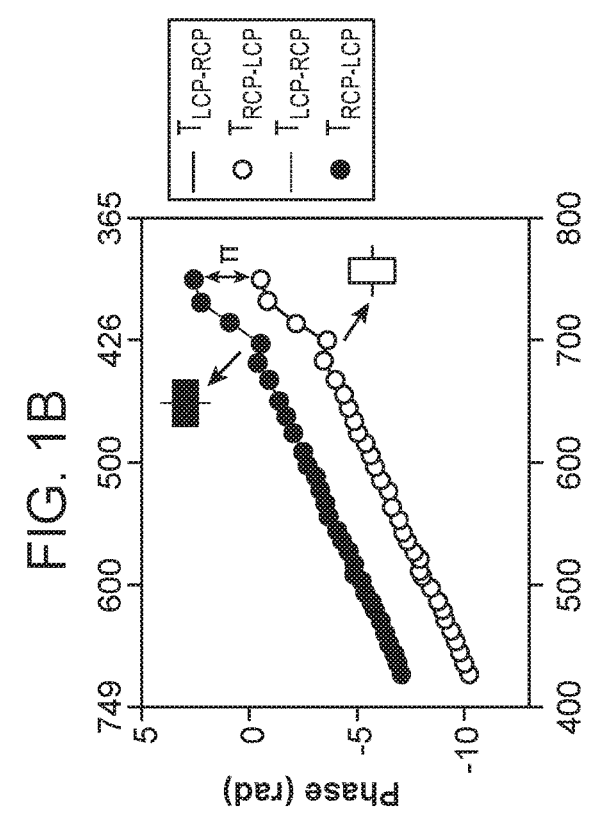
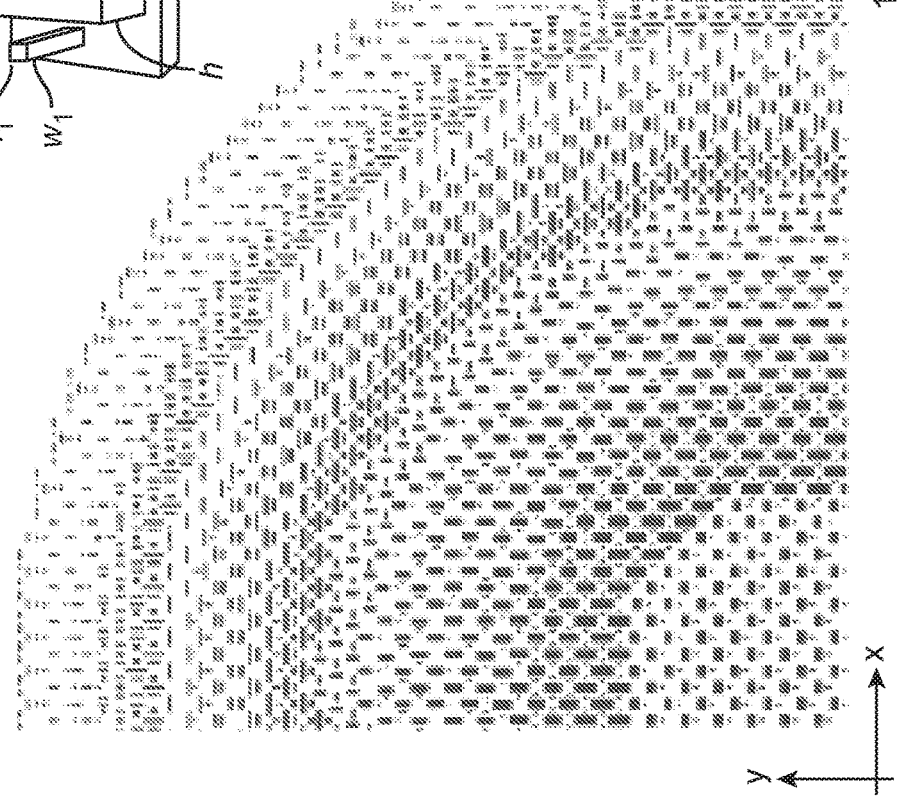
FIG. 1A
FIG. 1B
FIG. 1C

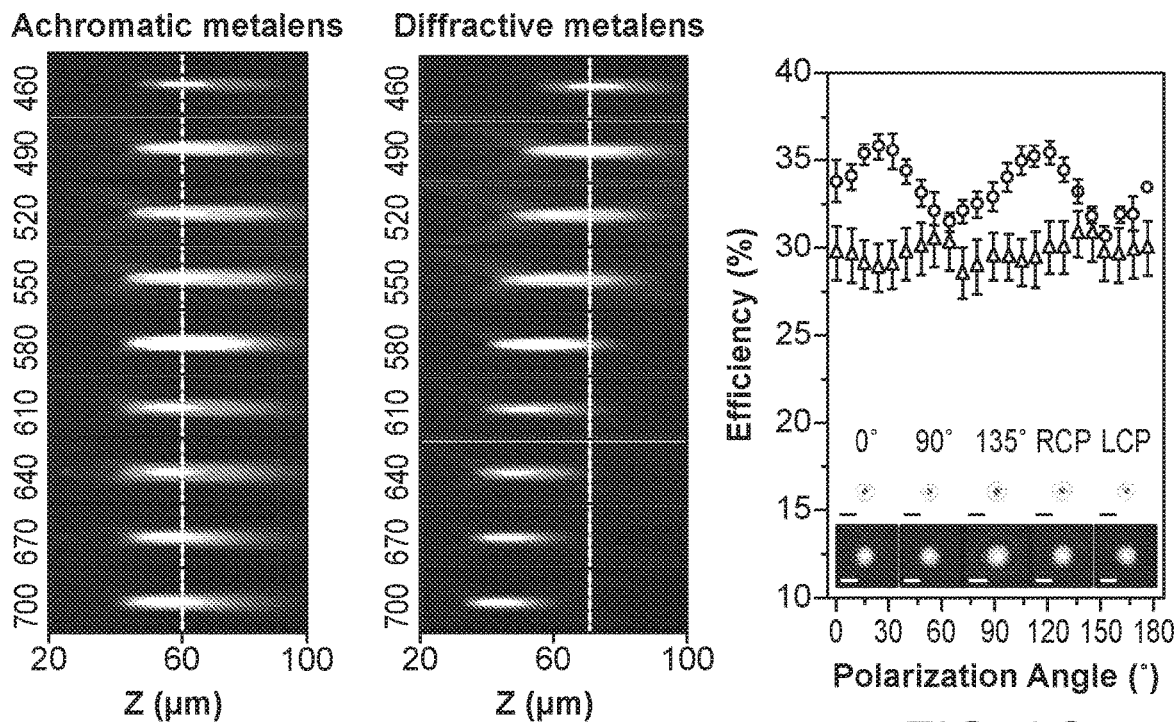
FIG. 3A
FIG. 3C
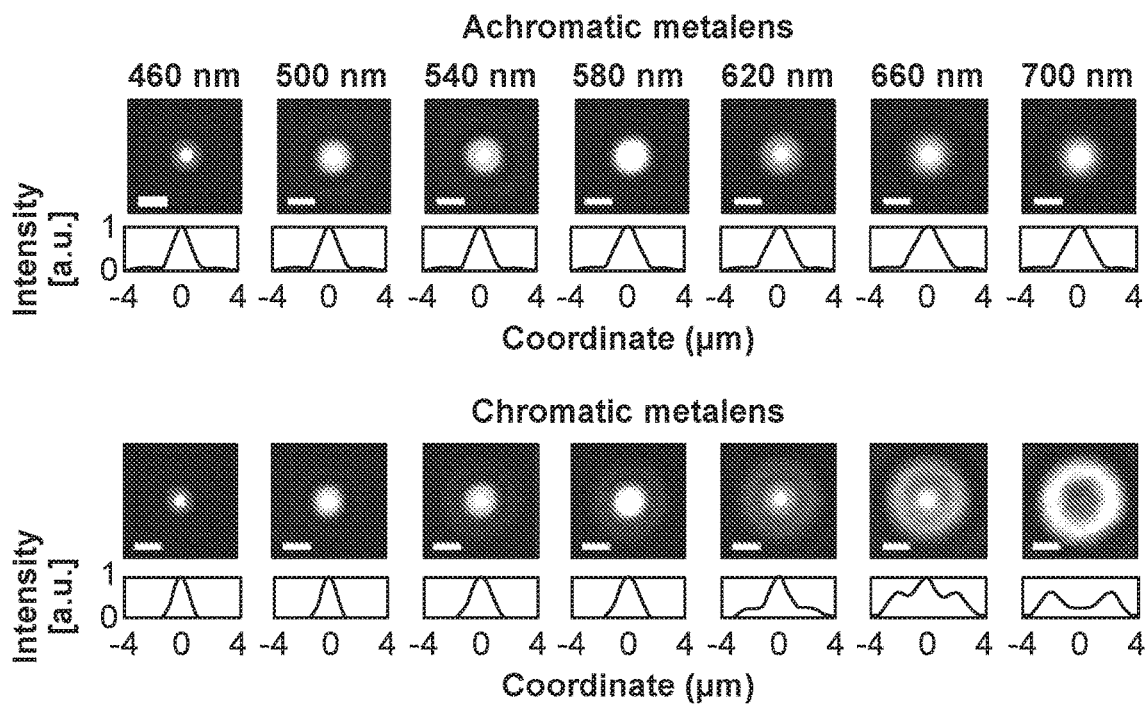
FIG. 3B

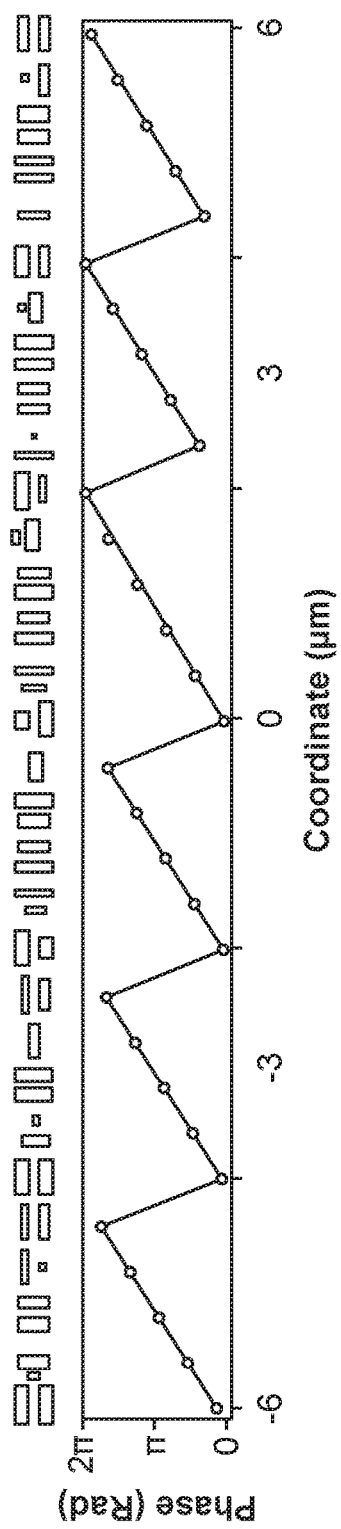
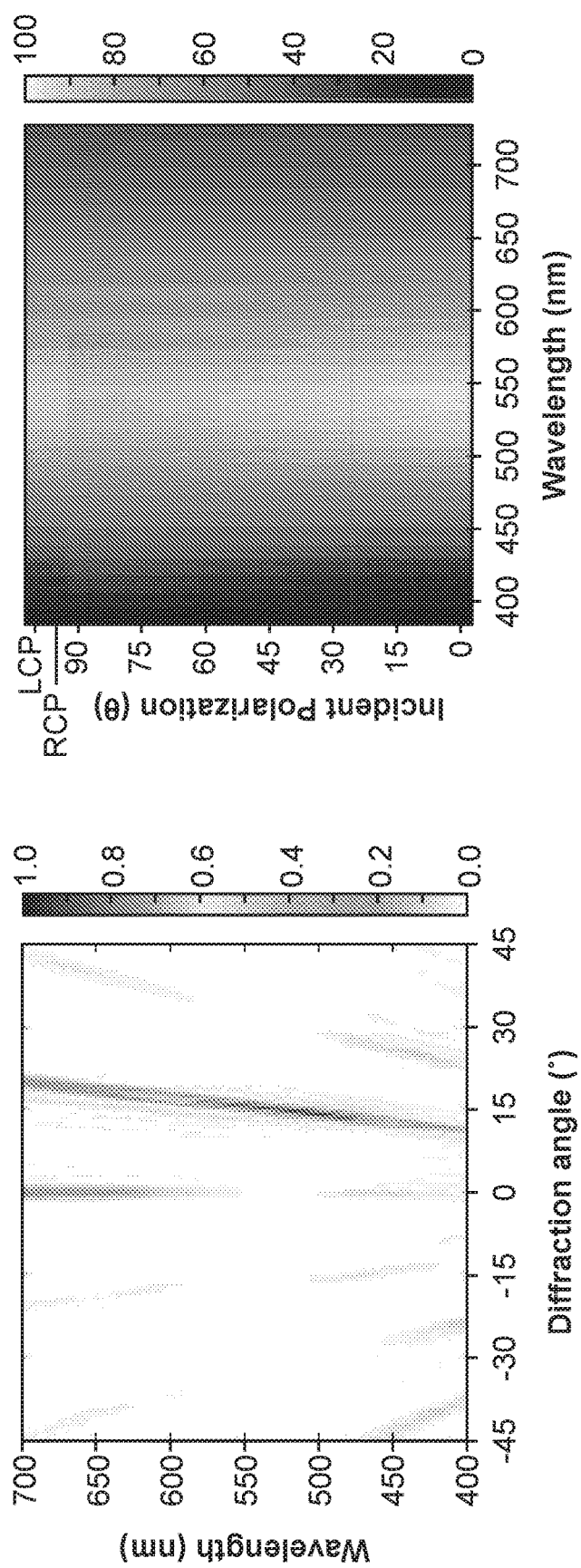
FIG. 4A
FIG. 4B
FIG. 4C

BROADBAND ACHROMATIC POLARIZATION-INSENSITIVE METALENS WITH ANISOTROPIC NANOSTRUCTURES

CROSS-REFERENCE TO RELATED APPLICATION

This application is a National Stage Entry of International Application No. PCT/US2019/052720, filed on Sep. 24, 2019, which claims the benefit of and priority to U.S. Provisional Patent Application No. 62/736,420, filed on Sep. 25, 2018, entitled "BROADBAND ACHROMATIC POLARIZATION-INSENSITIVE METALENS WITH ANISOTROPIC NANOSTRUCTURES," the contents of which are incorporated herein by reference in their entirety.

STATEMENT OF FEDERALLY SPONSORED RESEARCH OR DEVELOPMENT

This invention is made with Government support under FA9550-14-1-0389 and FA9550-16-1-0156, awarded by Air Force Office of Scientific Research and HR00111810001 awarded by the Defense Advanced Research Projects Agency. The Government has certain rights in the invention.

BACKGROUND

Metasurfaces, comprising sub-wavelength spaced nanostructures at an interface, provide the ways to accurately control the properties of light, including phase, amplitude, and polarization. This allows for the possibility of highly compact and efficient devices. Amongst these devices, metalenses have attracted intense interest due to their applicability to both consumer (e.g., phone cameras, virtual or augmented reality headsets) and industry products (e.g., microscopy, lithography, sensors, and displays).

SUMMARY

Metasurfaces have attracted widespread attention due to an increasing demand of compact and wearable optical devices. For many applications, polarization-insensitive metasurfaces are highly desirable and appear to limit the choice of their constituent elements to isotropic nanostructures. This greatly restricts the degrees of geometric parameters available in designing each nanostructure.

According to at least some embodiments of the present disclosure, a polarization-insensitive metalens is disclosed using, e.g., anisotropic nanofins (or other types of nanostructures) that offer additional control over the dispersion and phase of the output light. As a result, a metalens can be achromatic and polarization-insensitive across nearly the entire visible spectrum from wavelength $\lambda$=from 460 nm to from 700 nm, while maintaining diffraction-limited performance. The metalens may include, e.g., a single layer of $TiO_2$ nanofins and has a numerical aperture of about 0.2 with a diameter of about 26.4 μm. The generality of the polarization-insensitive design allows it to be implemented in a plethora of other metasurface devices with applications ranging from imaging to virtual or augmented reality.

In some embodiments, according to a first aspect of the present disclosure, an optical device includes a metasurface including a plurality of anisotropic nanoscale elements defining an optical profile that focuses a broadband incident light beam to a diffraction limited spot; wherein the optical profile is insensitive to a polarization state of the broadband incident light beam and tailorable according to wavelengths of the incident light.

In some embodiments according to the first aspect the present disclosure, each of the anisotropic nanoscale elements includes multiple nanostructures.

In some embodiments according to the first aspect the present disclosure, the anisotropic nanoscale elements offer a freedom to impart an additional $\pi$ phase shift by a 90-degree rotation without changing dispersion, wherein the dispersion corresponds to phase delay changes with wavelengths.

In some embodiments according to the first aspect the present disclosure, lengths and widths of the nanostructures of anisotropic nanoscale elements vary to tune a phase term, a group delay term and a group delay dispersion term to impart the tailorable optical profile with wavelengths.

In some embodiments according to the first aspect the present disclosure, the anisotropic nanoscale elements are made of $TiO_2$, GaN, $Si_3N_4$, $SiO_2$, $Al_2O_3$ or other lossless optical glasses in the visible spectrum.

In some embodiments according to the first aspect the present disclosure, each of the anisotropic nanoscale elements is aligned either substantially parallel or substantially perpendicular to a neighboring one of the anisotropic nanoscale elements.

In some embodiments according to the first aspect the present disclosure, the broadband incident light beam includes a plurality of wavepackets, and the optical profile includes a phase term that specifies parameters of the anisotropic nanoscale elements such that the wavepackets are transmitted towards the diffraction limited spot.

In some embodiments according to the first aspect the present disclosure, the broadband incident light beam includes a plurality of wavepackets, and the optical profile includes a group delay term that specifies parameters of the anisotropic nanoscale elements such that the wavepackets arrive the diffraction limited spot simultaneously.

In some embodiments according to the first aspect the present disclosure, the group delay term is a first order derivative term of the optical profile.

In some embodiments according to the first aspect the present disclosure, the broadband incident light beam includes a plurality of wavepackets, and the optical profile includes a group delay dispersion term that specifies parameters of the anisotropic nanoscale elements such that the wavepackets arriving at the diffraction limited spot have an identical width in a time domain.

In some embodiments according to the first aspect the present disclosure, the group delay dispersion term is a second order derivative term of the optical profile.

In some embodiments according to the first aspect the present disclosure, the wavelengths of the incident light are within a visible spectrum.

In some embodiments, according to a second aspect of the present disclosure, an optical device includes a metasurface including a plurality of anisotropic nanoscale elements imparting an optical profile that efficiently disperses light to different diffraction angles; wherein the optical profile is insensitive to a polarization state of the broadband incident light beam and maintains unchanged with wavelengths.

In some embodiments according to the second aspect the present disclosure, the optical profile is an optical profile of a lens, a grating, or an axicon.

In some embodiments according to the second aspect the present disclosure, a light efficiency of the optical device is higher than 60% compared to a power of incident light.

BRIEF DESCRIPTION OF THE DRAWINGS

For a better understanding of the nature and objects of some embodiments of this disclosure, reference should be made to the following detailed description taken in conjunction with the accompanying drawings.

FIG. 1 illustrates an example of a polarization-insensitive and achromatic metalens. FIG. 1A shows a layout of a quadrant of the metalens. The metalens has an numerical aperture (NA) of about 0.2 and a diameter of about 26.4 μm. The inset shows a schematic diagram of its constituent elements. Each element includes $TiO_2$ nanofins of the same height h=about 600 nm. These metalens elements are spaced equally along the x- and y-directions with a lattice constant of 400 nm. FIG. 1B shows a scanning electron microscope image of a part of the fabricated metalens, with a scale bar of about 1 μm. The inset shows a magnified and oblique view of the nanofins, with a scale bar of about 500 nm. FIG. 1C shows simulated phase shift of the component of the transmitted electric field with polarization orthogonal to the incident circularly polarized light. The legend, for example $T_{LCP \to RCP}$, represents the phase of RCP transmitted light under LCP incidence. The top curve and the bottom curve show the same element, including three nanofins, oriented along horizontal and vertical directions, respectively. The nanofin parameters may be about ($w_1$, $l_1$, $w_2$, $l_2$, $w_3$, $l_3$, g)=(50, 50, 170, 370, 50, 90, 60) in nanometer units. The element shows identical phase under both RCP and LCP illuminations. Note that for a given circular polarization, a about 90-degree rotation may introduce a π phase shift without affecting group delay (slope) and group delay dispersion (curvature).

FIG. 2 illustrates a comparison of specified and realized phase, group delay, and group delay dispersion for the metalens shown in FIG. 1A.

FIG. 3 illustrates measured focal spot profiles and efficiencies for achromatic and diffractive metalenses. The measured metalenses have a NA=about 0.2 and a focal length of about 67 μm at λ=about 560 nm. FIG. 3A shows measured intensity distributions in the y-z plane corresponding to their respective wavelengths in the visible (labelled to left of plots in nanometers). The left and right panels correspond to achromatic and diffractive metalenses respectively. The latter, as a control sample, may be realized without dispersion engineering and has a focal length shift similar to that of Fresnel lenses. Incident light travels along the positive z-axis. FIG. 3B shows normalized intensity profiles along the white dashed lines of FIG. 3A, for the achromatic metalens (top) and the diffractive metalens (bottom). The position of the dashed line corresponds to the focal length at λ=about 460 nm. FIG. 3C shows efficiency of the achromatic metalens as a function of the angle of linearly polarized incident light in steps of about 4°. The illumination light sources are alternately a single wavelength of about 532 nm diode laser and a tunable broadband laser with about 200 nm bandwidth centered at about 570 nm. The measured efficiencies using the monochromatic and broadband light source are represented by the top and bottom symbols, respectively. The inset shows the focal spot profile, with the top and bottom rows corresponding to the diode (monochromatic) and tunable broadband laser illumination, respectively. The polarizations of input light are labelled at the top, with a scale bars of about 2 μm.

FIG. 4 illustrates simulated efficiency for a polarization-insensitive phase-gradient metasurface. FIG. 4A shows a layout of the designed metasurface. The metasurface includes mutually parallel and perpendicular nanofins with the geometries and orientations chosen to deflect a normal incident beam to an angle of about 15 degrees at the design wavelength of about 530 nm. The bottom panel shows the target and realized phases in a line and circles, respectively. FIG. 4B shows normalized far-field power under x-polarized incidence as a function of incident wavelength and diffraction angles. FIG. 4C shows diffraction efficiency for the metasurface across the visible spectrum under linear and circular polarizations. The polarization angles are labelled on the y-axis, while the last two rows showing the cases for right- and left-handed polarizations. At each wavelength, the efficiency is maintained at a relatively constant value, thus displaying the polarization insensitivity.

FIG. 5 illustrates Strehl ratios and focal spot sizes of an achromatic and polarization-insensitive metalens.

where λ is the incident wavelength and NA is the numerical aperture with a value of about 0.2.

Figure 6:
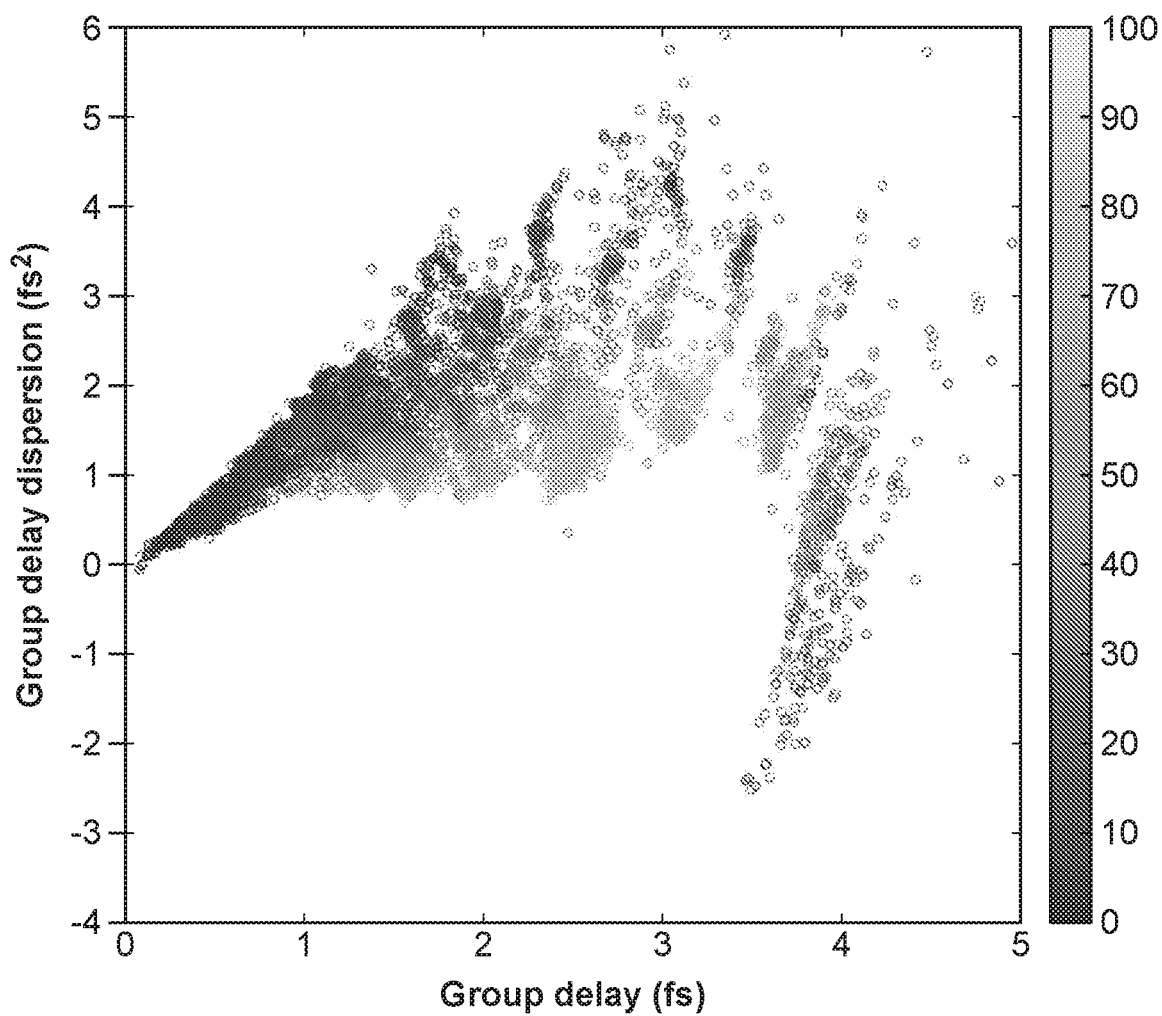

FIG. 6 illustrates polarization conversion efficiencies of each library element as a function of group delay (GD) and group delay dispersion (GDD) at the design wavelength, $\lambda_d$=about 560 nm. The polarization conversion efficiency (%) of each library element is shown. The polarization conversion efficiency may be normalized to the transmitted power through a glass and air interface.

Figure 7:
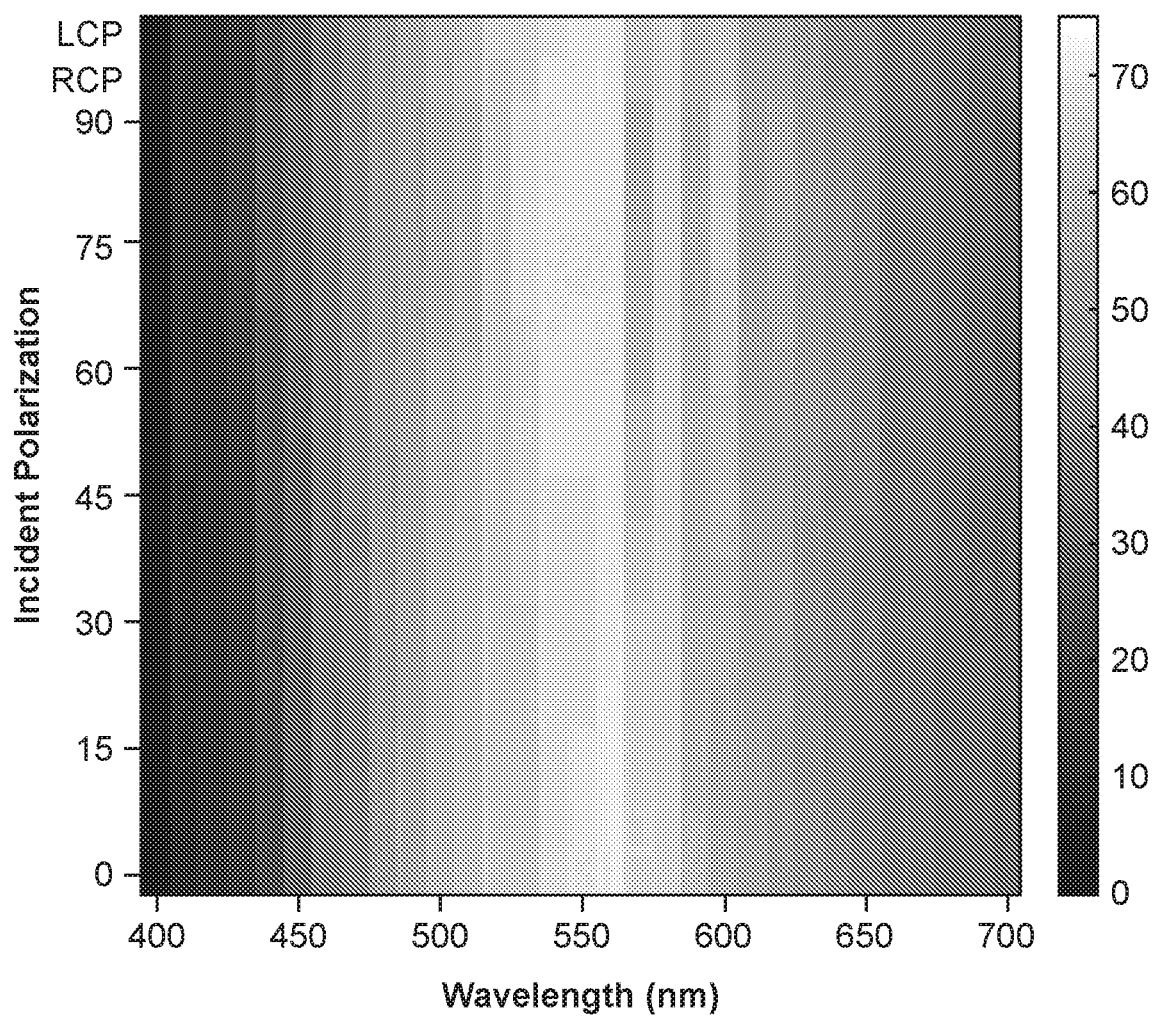

FIG. 7 illustrates an absolute efficiency of a chromatic metasurface beam deflector. The absolute efficiency of the chromatic metasurface beam deflector is shown across the visible spectrum for all linear and both circular incident polarizations. The absolute efficiency may be defined by the power diffracted to about 15° divided by a total incident power.

DETAILED DESCRIPTION

There are works that have focused on developing the broadband achromatic focusing capabilities of metalenses in the visible spectrum. However, these metalenses suffer from polarization sensitivity, e.g., they can focus light with a certain circular polarization. This challenge may be overcome by using symmetric cylindrical or square-shaped nano-pillars. However, by doing so a degree of freedom is lost in the design space due to the symmetry.

At least some embodiments of the present disclosure describe simultaneously achieving an achromatic and polarization-insensitive metalens in the visible spectrum using anisotropic, e.g., TiO$_2$ nanofins, different from approaches associated with spatial multiplexing and symmetry. These anisotropic nanofins allow accurately implementing the phase and its higher-order derivatives (e.g., group delay and group delay dispersion) with respect to frequency simultaneously. The disclosed technology describes a design and fabrication of a metalens with a numerical aperture (NA) of about 0.2. The metalens exhibits a measured focal length shift of about 9% and has diffraction-limited focal spots from wavelength λ=about 460 to about 700 nm. The focusing efficiency of the metalens varies by about 4% under various incident polarizations. To showcase the generality of the principle, it is also demonstrated a polarization-insensitive metasurface with diffraction efficiency of about 92% at wavelength λ=about 530 nm.

Principle

To achromatically focus a broadband incident beam in a diffraction limited spot, a metalens imparts a spatial- and frequency-dependent phase profile given by $$\varphi(r, \omega) = -\frac{\omega}{c}\left(\sqrt{r^2 + F^2} - F\right) \quad (1)$$

where r, ω, and F are the lens radial coordinate, angular frequency, and a constant focal length, respectively. The Taylor expansion of Eq. 1:

$$\varphi(r, \omega) = \varphi(r, \omega_d) + \frac{\partial \varphi}{\partial \omega}\bigg|_{\omega=\omega_d}(\omega - \omega_d) + \frac{\partial^2 \varphi}{2\partial \omega^2}\bigg|_{\omega=\omega_d}(\omega - \omega_d)^2 + \ldots \quad (2)$$

identifies the desired phase $\varphi(r,\omega_d)$, group delay $$\frac{\partial \varphi}{\partial \omega}\bigg|_{\omega=\omega_d},$$

and group delay dispersion $$\frac{\partial^2 \varphi}{\partial \omega^2}\bigg|_{\omega=\omega_d}$$

to be fulfilled at every lens coordinate r. An intuitive way to understand each term in Eq. 2 is to treat the incident light as wavepackets. The desired phase profile sends incident wavepackets towards the focus, while the first and the higher order derivative terms ensure that the incident wavepackets arrive at the focus simultaneously and identically in the time domain, respectively. The challenge here lies in the fact that the chosen nanostructures satisfy each derivative term in Eq. 2 at every lens coordinate. In some embodiments, some designs made use of the geometric (or Pancharatnam-Berry) phase principle to decouple the phase $\varphi(r,\omega_d)$ from the dispersion (group delay and group delay dispersion). However, this approach also comes with an unwanted polarization-sensitivity; in other words, these metalenses can focus incident light with a particular circular polarization.

According to some embodiments of the present disclosure, Pancharatnam-Berry phase is involved; however, the aforementioned drawback is circumvented by specifying the rotation angle of each anisotropic element to be aligned either substantially parallel or substantially perpendicular to a neighboring one of the anisotropic elements (e.g. to have a rotation of about 0 or about 90 degrees, or about +45 degrees or about −45 degrees). Each element includes one or multiple nanofins to provide additional degrees of freedom to engineer the dispersion (FIG. 1A, inset). The layout of a fraction of the achromatic and polarization-insensitive metalens is shown in FIG. 1A and a scanning electron microscope image of a region of the fabricated metalens is shown in FIG. 1B. To tune the phase and dispersion, each nanofin's length and width may be varied and the gap g between nanofins is set to be, e.g., either about 60 nm or about 90 nm. By using anisotropic elements instead of symmetrical circular or square pillars, additional geometric parameters can be altered for better dispersion control. In addition, the anisotropic elements offer a freedom to impart an additional π phase shift without changing their dispersion characteristics. The additional freedom can be used to fulfill both the desired phase and dispersion given by Eq. 2, and can be explained by the Pancharatnam-Berry phase.

When light passes through a nanofin, the transmitted electric field can be described by the Jones vector:

$$\begin{bmatrix} \tilde{E}_x \\ \tilde{E}_y \end{bmatrix} \frac{\tilde{t}_l + \tilde{t}_s}{2}\begin{bmatrix} 1 \\ \pm i \end{bmatrix} + \frac{\tilde{t}_l - \tilde{t}_s}{2}\exp^{\pm i2\alpha}\begin{bmatrix} 1 \\ \mp i \end{bmatrix} \quad (3)$$

$\tilde{t}_l$ and $\tilde{t}_s$ represent complex transmission coefficients when the normalized electric field of the incident light is polarized along the long and short axis of the nanofin, respectively. The α term is defined as the counterclockwise rotation angle of the nanofin with respect to the x-axis. The first term of Eq. 3 may cause unwanted scattering and can be minimized if the nanofin is designed as a miniature half-waveplate. In this case, the amplitude of the second term $$\text{abs}\left(\frac{\tilde{t}_l - \tilde{t}_s}{2}\right)$$

increases, corresponding to maximal polarization conversion efficiency. The $\exp^{\pm i2\alpha}$ in the second term is accompanied by a polarization converted term and illustrates the origin of Pancharatnam-Berry phase. Under left-handed circularly polarized incidence, a rotation of α imparts a frequency-independent phase of 2α to the right-handed circularly polarized output light without affecting the dispersion, which is determined by $$\frac{\tilde{t}_l - \tilde{t}_s}{2}.$$

This may result in polarization-sensitivity because the values of $\exp^{i2\alpha}$ and $\exp^{-i2\alpha}$ obtained under left and right circular polarized (LCP and RCP) incident light, respectively, are not identical. However, if one arranges the nanofin with about α=0° or about α=90°, their values become equal. Therefore, both RCP and LCP incident light may experience the same phase profile upon interacting with a metasurface including either mutually parallel or perpendicular nanofins. Since any incident polarization can be decomposed into a combination of LCP and RCP, this property implies that the metasurface is polarization insensitive. FIG. 1C confirms the results predicted by Eq. 3. A metalens element provides the same phase for RCP (line) and LCP (circles) incidence, and, for a given circular polarization incidence, a 90 degree rotation imparts a π phase shift without affecting group delay (slope) and group delay dispersion (curvature).

Design of an Achromatic and Polarization-Insensitive Metalens

Figure 2A:
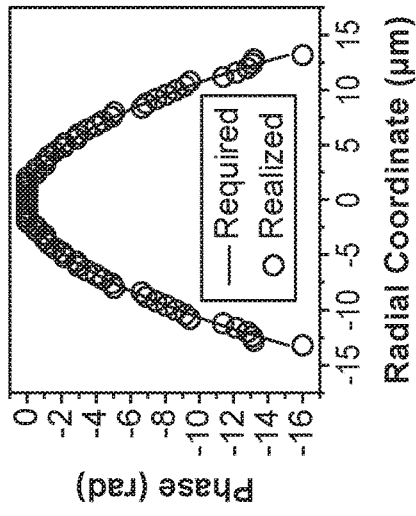
FIG. 2A shows phase, group delay, and group delay dispersion for all elements in the simulation library and specified values. Each element is represented by two associated point in the plot because a 90-degree rotation can impart a phase change of π without changing its group delay and group delay dispersion.

The design of the polarization-insensitive and achromatic metalens may start from a parameter sweep of the element shown in the inset of FIG. 1A to build a library. The process may use a finite-difference time-domain (FDTD) solver to obtain each element's phase at λ=about 530 nm, as well as its group delay and group delay dispersion. FIG. 2A shows the three quantities of interest, phase, group delay, and group delay dispersion, at the design wavelength of about 530 nm for each element. There may be over ten-thousand geometrical combinations, resulting in a dense scatter plot of dots to fine tune the dispersion. Note that due to the principle outlined in FIG. 1C, an element rotated by 90 degrees may experience a π phase shift for all frequencies with no change in the values of its dispersion. As a result, the library can be extended, allowing for better implementation of the desired phase and dispersion, which were calculated based on Eq. 1 for an achromatic metalens with a diameter of about 26.4 µm and NA=about 0.2.

Figure 2B:
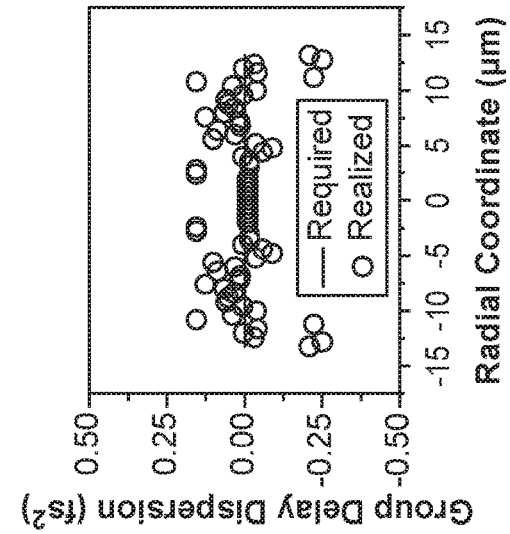
FIGS. 2B, 2C, and 2D show realized (circles) and specified (curves) phase, group delay, and group delay dispersion at each radial coordinate across the polarization-insensitive and achromatic metalens.
Figure 2C:
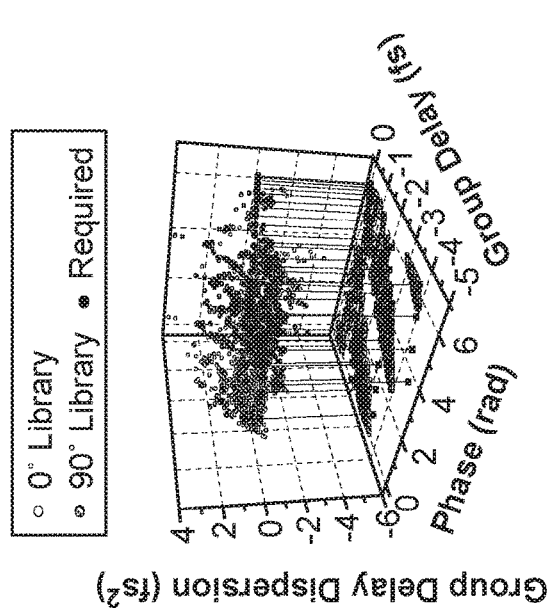
Figure 2D:
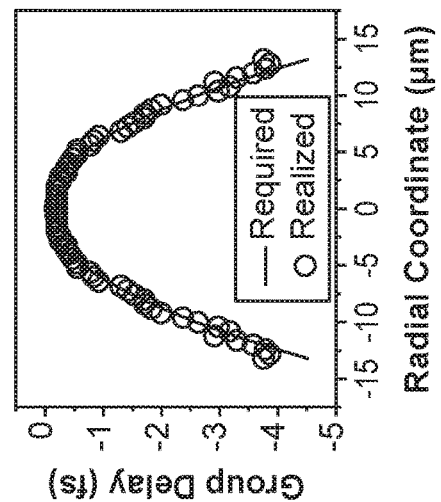

To realize the metalens, the elements selected may be those closest to the specified points in the 3-dimensional space of phase, group delay, and group delay dispersion displayed in FIG. 2A. Because the relative values of these parameters are utilized, the library can be shifted in this 3-dimensional space to better fit the specific values. A particle swarm optimization method may be used to find the optimal shifts for phase, group delay, and group delay dispersion, which minimizes the distance between each point and the values provided by the elements in the library. The final results can be better visualized in FIGS. 2B, 2C, and 2D. The phase, group delay, and group delay dispersion of the selected metalens elements are shown, together with the corresponding desired values (curves). In some embodiments, merely terms up to the group delay dispersion are considered because the values of any higher orders for selected elements diminish along with the order number.

Fabrication and Results

The achromatic and polarization insensitive metalens may be fabricated using, e.g., electron beam lithography followed by atomic layer deposition of TiO$_2$ and resist removal. The performance of the fabricated device is compared to a diffractive metalens of the same diameter and NA. The comparative diffractive metalens may be designed using a nanofin with the same length and width, but varying rotation angle. The diffractive metalens represents the case without dispersion engineering and may have a focal length shift similar to a Fresnel lens.

The fabricated metalens may achieve a complete metalens with a smaller lens diameter and a higher NA of, e.g., about 0.6, with achromatic and polarization-insensitive focusing behavior. The focal length shifts of the fabricated achromatic and diffractive metalenses may be determined by measuring the point spread functions at each wavelength along the propagation direction (z-axis) with about 1 µm resolution (FIG. 3A). The left panel in FIG. 3A shows a small focal length variation of about 6 µm for the achromatic metalens compared to that of about 30 µm in the diffractive metalens (right panel).

Figures 5A, 5B:
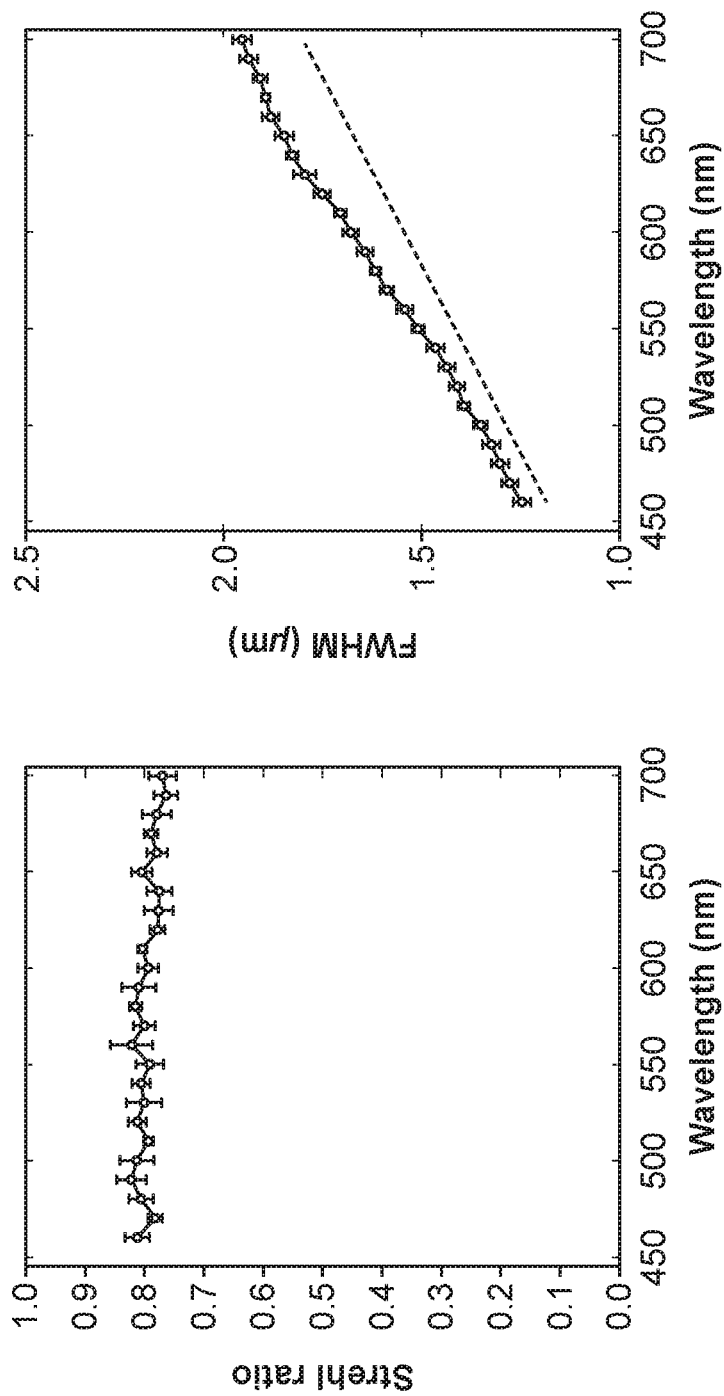
FIG. 5A shows Strehl ratio as a function of incident wavelength. The Strehl ratio may be calculated by dividing the peak intensity of the measured focal spot with that of the theoretical Airy disk assuming the power within their second main lobes are equal.
FIG. 5B shows full-width at half-maxima (FWHM) of measured focal spots. The dashed line shows the theoretical focal spot sizes given by $$\frac{0.514 \cdot \lambda}{NA},$$

The normalized intensity profiles along the white dashed lines can be seen in FIG. 3B, with the top panel corresponding to the achromatic metalens and the bottom panel corresponding to the chromatic metalens. The achromatic metalens is diffraction-limited and its focal sizes and Strehl ratios as a function of wavelengths are given in FIG. 5.

The achromatic metalens is also shown to be polarization insensitive by measuring the efficiency of the focal spot with changing polarizations of incident light. This measurement may be performed by changing the angle of linearly polarized incident light from about 0° to about 90° in steps of about 4°. The measured efficiencies slightly vary with polarization, as shown in FIG. 3C, which proves polarization-insensitive focusing. The symbols show the measured efficiencies at a single wavelength of about 532 nm and under broadband light from about 470 to about 670 nm, respectively. Note that the polarization state of the metalens' focal spot can be different from that of the incident light due to the phase of the polarization converted term (the $2^{nd}$ term of Eq. 3).

In some embodiments, the metalens efficiency depends on the fact that some low polarization conversion elements may be selected to cover a large range of dispersion values for achromaticity (see FIG. 6 for a plot of efficiency and dispersion). However, the polarization-insensitive design approach does not exclude the design of highly-efficient metasurfaces. For example, FIG. 4A shows that the layout of a conventional chromatic metasurface beam deflector designed for wavelength λ=about 530 nm with an output diffraction angle of about θ=15°. FIG. 4B shows the normalized far-field power across the visible under x-polarized incidence as a function of wavelength. The metasurface has mainly a single diffraction beam over a bandwidth of about 50 nm centered at about 530 nm and results in a high diffraction efficiency of about 92%. The diffraction efficiency is defined as the power of the first (+1) diffraction order divided by that of transmitted power. It can be numerically verified in FIG. 4C that such a high diffraction efficiency is maintained under various linearly and circularly polarized incident beams. It can be seen that at a given wavelength, the efficiency remains relatively constant across all polarizations, highlighting the polarization insensitivity. The absolute efficiency at λ=about 530 nm, e.g., the power diffracted to 15 degrees divided by total incident power, may be about 70% (see FIG. 7 for a plot of the absolute efficiency of the metasurface).

In some embodiments, a metasurface includes a substrate and a plurality of nanoscale elements on the substrate. The substrate may be, for example, a glass (e.g., silica (SiO$_2$)) substrate. In some embodiments, in addition or alternative to TiO$_2$, nanoscale elements may include other suitable dielectric materials including those having a light transmittance over a design wavelength or a range of design wavelengths of at least about 40%, at least about 50%, at least about 60%, at least about 70%, at least about 80%, at least about 85%, at least about 90%, or at least about 95%. For example, other suitable dielectric materials can be selected from oxides (such as an oxide of aluminum (e.g., Al$_2$O$_3$), silicon (e.g., SiO$_2$), hafnium (e.g., HfO$_2$), zinc (e.g., ZnO), magnesium (e.g., MgO), or titanium (e.g., TiO$_2$)), nitrides (such as nitrides of silicon (e.g., Si$_3$N$_4$), boron (e.g., BN), or tungsten (e.g., WN)), sulfides and pure elements. In some embodiments, each nanoscale elements includes multiple nanostructures. In some embodiments, a cross-section of each nanostructure has a two-fold symmetry, such as rectangular or elliptical.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An optical device, comprising:
   a metasurface including a plurality of anisotropic nanoscale elements defining an optical profile that focuses a broadband incident light beam to a diffraction limited spot;
   wherein the optical profile is insensitive to a polarization state of the broadband incident light beam and tailorable according to wavelengths of the incident light; and
   wherein the broadband incident light beam includes a plurality of wavepackets, and the optical profile includes a phase term that specifies parameters of the anisotropic nanoscale elements such that the wavepackets are transmitted towards the diffraction limited spot.

2. The optical device of claim 1, wherein each of the anisotropic nanoscale elements includes multiple nanostructures.

3. The optical device of claim 2, wherein the anisotropic nanoscale elements offer a freedom to impart an additional $\pi$ phase shift by a 90-degree rotation without changing dispersion, wherein the dispersion corresponds to phase delay changes with wavelengths.

4. The optical device of claim 2, wherein lengths and widths of the nanostructures of anisotropic nanoscale elements vary to tune the phase term, a group delay term and a group delay dispersion term to impart the tailorable optical profile with wavelengths.

5. The optical device of claim 2, wherein the anisotropic nanoscale elements are made of $TiO_2$, GaN, $Si_3N_4$, $SiO_2$, $Al_2O_3$ or other lossless optical glasses in the visible spectrum.

6. The optical device of claim 1, wherein each of the anisotropic nanoscale elements is aligned either substantially parallel or substantially perpendicular to a neighboring one of the anisotropic nanoscale elements.

7. The optical device of claim 1, wherein the optical profile includes a group delay term that specifies parameters of the anisotropic nanoscale elements such that the wavepackets arrive at the diffraction limited spot simultaneously.

8. The optical device of claim 7, wherein the group delay term is a first order derivative term of the optical profile.

9. The optical device of claim 1, wherein the optical profile includes a group delay dispersion term specifies parameters of the anisotropic nanoscale elements such that the wavepackets arriving at the diffraction limited spot have an identical width in a time domain.

10. The optical device of claim 9, wherein the group delay dispersion term is a second order derivative term of the optical profile.

11. The optical device of claim 1, wherein the wavelengths of the incident light are within a visible spectrum.

12. An optical device, comprising:
    a metasurface including a plurality of anisotropic nanoscale elements defining an optical profile that focuses a broadband incident light beam to a diffraction limited spot;
    wherein the optical profile is insensitive to a polarization state of the broadband incident light beam and tailorable according to wavelengths of the incident light;
    wherein each of the anisotropic nanoscale elements includes multiple nanostructures; and
    wherein lengths and widths of the nanostructures of anisotropic nanoscale elements vary to tune a phase term, a group delay term and a group delay dispersion term to impart the tailorable optical profile with wavelengths.

13. The optical device of claim 12, wherein the anisotropic nanoscale elements offer a freedom to impart an additional $\pi$ phase shift by a 90-degree rotation without changing dispersion, wherein the dispersion corresponds to phase delay changes with wavelengths.

14. The optical device of claim 12, wherein the anisotropic nanoscale elements are made of $TiO_2$, GaN, $Si_3N_4$, $SiO_2$, or $Al_2O_3$.

15. The optical device of claim 12, wherein the broadband incident light beam includes a plurality of wavepackets, and the optical profile includes the group delay dispersion term that specifies parameters of the anisotropic nanoscale elements.

16. An optical device, comprising:
a metasurface including a plurality of anisotropic nanoscale elements defining an optical profile that focuses an incident light beam to a diffraction limited spot,
wherein each set of neighboring anisotropic nanoscale elements of the plurality of anisotropic nanoscale elements includes two anisotropic nanoscale elements, a long axis of each of the two anisotropic nanoscale elements aligned either substantially parallel or substantially perpendicular to each other;
wherein the optical profile is insensitive to a polarization state of the incident light beam; and
wherein the metasurface is achromatic from a wavelength of 460 nm to 700 nm.

17. The optical device of claim 16, wherein:
each of the anisotropic nanoscale elements includes multiple nanostructures; and
varying lengths and widths of the nanostructures of anisotropic nanoscale elements tune a phase term, a group delay term and a group delay dispersion term to impart the optical profile with wavelengths.

18. The optical device of claim 16, wherein:
each of the anisotropic nanoscale elements includes multiple nanostructures; and
the anisotropic nanoscale elements offer a freedom to impart an additional $\pi$ phase shift by a 90-degree rotation.

19. The optical device of claim 16, wherein the incident light beam includes a plurality of wavepackets, and the optical profile includes a phase term that specifies parameters of the anisotropic nanoscale elements such that the wavepackets are transmitted towards the diffraction limited spot.

20. The optical device of claim 16, wherein the incident light beam includes a plurality of wavepackets, and the optical profile includes a group delay dispersion term that specifies parameters of the anisotropic nanoscale elements.

* * * * *